(12) United States Patent  (10) Patent No.: US 7,949,593 B2
Norris  (45) Date of Patent: May 24, 2011

(54) REPURCHASE AGREEMENT LENDING FACILITY

(75) Inventor: Paul Norris, Ellicott City, MD (US)

(73) Assignee: Fannie Mae, Washington, DC (US)

( * ) Notice: Subject to any disclaimer, the term of this patent is extended or adjusted under 35 U.S.C. 154(b) by 2785 days.

(21) Appl. No.: 09/998,332

(22) Filed: Dec. 3, 2001

(65) Prior Publication Data

US 2003/0074300 A1    Apr. 17, 2003

Related U.S. Application Data

(60) Provisional application No. 60/329,310, filed on Oct. 16, 2001.

(51) Int. Cl.
*G06Q 40/00* (2006.01)
(52) U.S. Cl. .................. 705/37; 705/35; 705/36; 705/38
(58) Field of Classification Search ............... 705/35–38
See application file for complete search history.

(56) References Cited

U.S. PATENT DOCUMENTS

| | | | |
|---|---|---|---|
| 5,101,353 A * | 3/1992 | Lupien et al. ................... | 705/37 |
| 5,812,988 A * | 9/1998 | Sandretto .................... | 705/36 R |
| 2001/0034686 A1 * | 10/2001 | Eder ............................... | 705/36 |
| 2001/0037284 A1 * | 11/2001 | Finkelstein et al. ............. | 705/37 |
| 2003/0083973 A1 * | 5/2003 | Horsfall .......................... | 705/37 |

OTHER PUBLICATIONS

Dictionary of finance and Investments, Fourth edition, HG151.D69 1995.*
(Corrected) Sumitomo Mitsui Banking Cuts 6-Month Group Net Profit Estimate, Jiji Press English News Service. Tokyo: Oct. 11, 2001. p. 1.*
U.K. Debt Management Office, Response to DMO Consultation Document on "Special" Gilt Repo Operations, Feb. 2000, London, U.K.
U.K. Debt Management Office, DMO Policy Regarding "Special" Gilt Repo Operations, Sep. 17, 1999, London, U.K.
U.K. Debt Management Office, Official Operations in the Gilt Edged Market, Sep. 1999, London, U.K.
Federal Reserve Bank of New York, Announcement of Revisions to the SOMA Securities Lending Program, Feb. 12, 1999.
Federal Reserve Bank of New York, SOMA Securities Lending Program Analysis of Public Comments, Attachement II to Announcement of Revisions to the SOMA Securities Lending Program, Feb. 12, 1999.
Federal Reserve Bank of New York, SOMA Securities Lending Program Terms and Conditions (revised), Sep. 7, 1999.

* cited by examiner

*Primary Examiner* — Alexander Kalinowski
*Assistant Examiner* — Clement B Graham
(74) *Attorney, Agent, or Firm* — Rader, Fishman & Grauer PLLC

(57) ABSTRACT

The present invention is a system and method of providing a repurchase facility for securities, bonds, and/or debt. The present invention is directed to a method for enhancing the liquidity of a tradable security, other than by an agency of Government trading in the Government security. The method comprises holding an issue of a security, determining when the security is being squeezed, and offering to the market a first portion of the holding during the squeeze to enhance the liquidity of the market for the security.

28 Claims, 3 Drawing Sheets

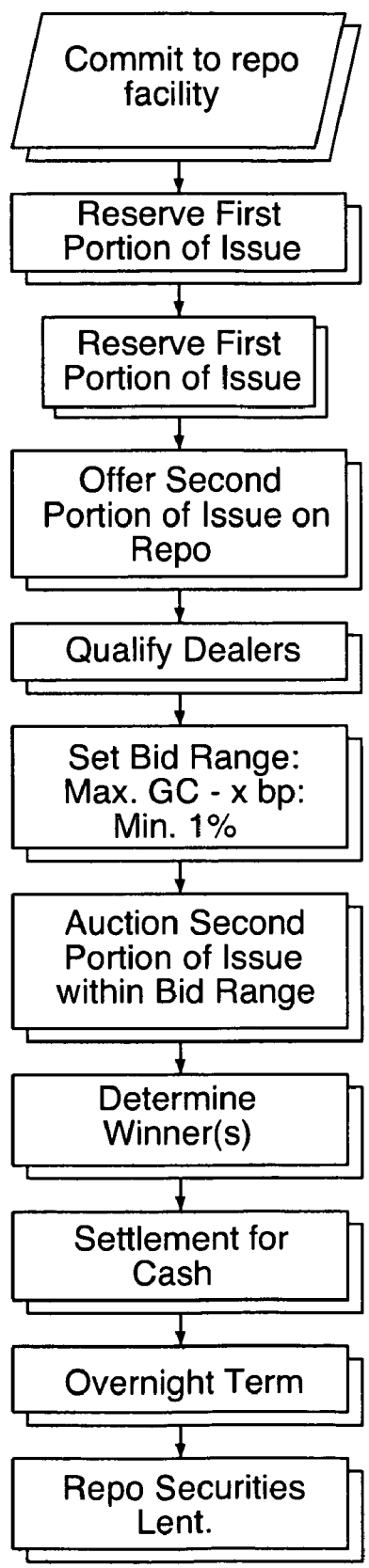

REPURCHASE AGREEMENT LENDING FACILITY

CROSS-REFERENCE TO RELATED APPLICATIONS

The present invention relates to, and is entitled to the benefit of the earlier filing date and priority of, U.S. Provisional Application No. 60/329,310, filed Oct. 16, 2001, a copy of which is incorporated herein by reference.

FIELD OF THE INVENTION

The present invention is a system and method of providing a repurchase facility for securities, bonds, and/or debt. In a preferred embodiment, the present invention is a repurchase agreement lending facility for debt issued by a business in order to improve the liquidity of the debt. The repurchase facility is preferably available when the security becomes "special." The present invention is particularly useful in increasing the liquidity of a debt or security by relieving a squeeze.

BACKGROUND OF THE INVENTION

The U.S. market for debt is a huge and significant part of the financial system. The U.S. debt market trades hundreds of billions of dollars every day. Businesses rely upon the availability of money in this market to finance their expansion. This market is a wholesale market for a low-risk, highly liquid, short-term debt. Typically, debt securities, rather than equities, are traded. A large portion of this market constitutes U.S. Treasury debt. In addition, billions of dollars of federal agency securities, negotiable bank certificates of deposit, bank deposit notes, bankers acceptances, short-term participations in bank loans, municipal notes, commercial paper, and various forms of corporate debt are also traded in this market.

There is a strong repurchase market for many of these securities. Recipients of billions of dollars of secured loans participate through this so-called "Repo Market." The Repo Market has become one of the biggest sectors in the U.S. money market. The Repo Market trades hundreds of billions of dollars a day.

Repurchase agreements involve the simultaneous sale and repurchase of an asset, typically a security. The seller buys back the asset, typically at the same price at which he sold it. On the buy-back date, the original seller pays the original buyer interest on the implicit loan created by the transaction. Interest is due on a repo at maturity at the stated repo rate for the stated maturity of the repo. See, Marcia Stigum, The Money Market, ($3^{rd}$ Ed.) (1990), Chapter 13, pp. 575-630, which are incorporated herein by reference.

Transactions in the repo market are referred to by various terms: a sale-repurchase agreement, a repo, or a reverse. When a dealer repos securities, he finances securities he owns or securities he has reversed in. In contrast, when an investor does a repo he invests in repo, that is, he finances someone else's securities purchase. A repo transaction is a collateralized loan. On the day the transaction is initiated, securities are sold against the money. On the day the transaction is unwound, these flows are reversed and the money and securities are returned to the original holders. The initial money holder earns interest on the transaction.

The Repo Market can provide added liquidity in the event that a market for a particular security is squeezed. For example, brokers and dealers in a particular security may attempt to capture a large portion of the market in that security on a particular date. In that event, the security may not be available at or near the market rate at which it or comparable securities are typically traded. This is referred to as going "special." When a special occurs, the availability of the security in the market is referred to as being "squeezed." This squeeze impairs the liquidity of the market for the debt. Purchasers of the security are forced to pay more for the security than for comparable debt. Although the issuer may, therefore, prefer some specialness in their issues, they do not desire severe or chronic squeezes, which reduce liquidity and may increase their long-term cost of financing. Thus, it is important for the issuer to be able to relieve the squeeze.

For example, a hedge fund may attempt to squeeze a particular security. If a dealer is attempting to hedge an investment, he may attempt to squeeze a particular issue of a security. Fewer of the issues of the security are available in the market and the price of the security rises. As the market is not available to provide the number of issues of the security that are desired by purchasers at or near the price at which comparable securities are trading, the liquidity of the debt is impaired.

Fannie Mae issues, among other securities, noncallable Benchmark Bills, Notes, and Bonds ("bullets") in a variety of terms: three or six month bills; one year bill; two to three year notes; five year notes; ten year notes; and thirty year notes. Fannie Mae also offers a variety of other securities, including: discount notes; callable Benchmark Notes, other callable notes and bonds, retail debt securities; as well as various step-up, variable rate, and zero-coupon securities. With respect to the market for Fannie Mae's securities, each issue of a security may be planned in volumes of $8-$10 billion dollars. In spite of the substantial volumes of securities available on the traded market, in a typical year there could be 80 days during the year when one or more of the issues has gone special. When this situation occurs, the availability of the security is squeezed and the liquidity of the issue is impaired. Purchasers pay more for the security. The present inventors believe that this problem may occur with respect to various private and public securities. Although techniques have been employed to address this situation with respect to certain types of Government securities, the present inventors are not aware of any techniques that have been used to address this problem with respect to securities other than Government debt. The present invention attempts to relieve the squeeze and increase the liquidity of the security that has gone special through an auction facility in the Repo Market for the security.

Prior to the present invention, the System Open Market Operations Account (SOMA) of the Federal Reserve Bank of New York has regularly undertaken to balance the money market in the United States. The Bank of England has offered facilities to increase the liquidity of debt issued by the government of the United Kingdom. Although each of these systems share some but not all elements in common with the present invention, the present inventors believe that the present invention offers features and benefits not found in either of these prior known methods for relieving a squeeze in the market for a security, and in particular, a non-Treasury security.

Banks intermediate our financial system through lending, which in turn results in the creation of additional money and expansion of the money supply in the economy. The Federal Reserve Board controls the level of bank intermediation through several tools: reserve requirements; open market operations; and discount window operations. Using these tools, the Federal Reserve is able to affect the supply of money in the economy and/or interest rates.

In addition to its primary functions of regulating the money supply and affecting interest rates, the Federal Reserve Bank of New York, through its SOMA, operates a securities lending program. The securities lending facility was established by the Federal Open Market Committee in 1969 in response to dealer requests for a program to improve the physical clearing of U.S. Government securities. The fund initially allowed borrowing up to $10 million dollars of a Treasury coupon issue and $50 million dollars of a Treasury bill issue from the SOMA Portfolio (at a fixed fee of 150 basis points or 1.5 percent). Borrowing was initially permitted only for the purpose of covering an expected fail to receive on the part of a dealer. In order to prevent the lending activity from affecting reserves, U.S. Treasury securities, rather than cash, are posted with the Federal Reserve as collateral.

By 1999, however, the SOMA repo program's borrowing limits had prevented the program from keeping pace with increases in Treasury market trading volume and SOMA Treasury security holdings. From 1969 to 1999, the market for Treasury securities grew over 80%—in average daily trading volume. The SOMA portfolio grew from $57 billion to over $450 billion. During that period, however, SOMA repo facility borrowing limits on Treasury bills and coupon issues remained fixed.

In February of 1999, the Fed announced plans for a new securities lending program which was launched in April of 1999. The purpose of the plan was to increase the liquidity in Repo Markets by providing a short-term flexible supply of issues that are not readily available to the market. Under this new program, the Fed provided a daily auction of securities. Securities are loaned to the dealer winning the auction for a period of one day. In return, the dealer pledges back to the Fed collateral (Treasury securities) of greater market value than the issues loaned. The maximum loan per issue is $100 million dollars and the maximum loan to any one dealer is $500 million par value of securities. Initially, the Fed lent a maximum of 25 percent of its holdings. That value has currently been raised to 40 percent of the amount of each Treasury issue in the Fed's holdings.

The minimum bid in the auction is 150 basis points through general collateral. The issue, therefore, must be trading at least 150 basis points below general collateral before it is economical for a broker to go to the Fed for the security rather than to the market. The purpose of the program is to reduce the number and average size of extreme outcomes in the Repo Market, not to become the main source for scarce issues. Credit Suisse First Boston Repo Product Guide, Appendix J: The Fed and the Repo Markets, at 59 (Jan. 2, 2000), which is incorporated herein by reference.

By 1999, the Fed had come to recognize that short positions in securities were an integral part of the market. Treasury securities were being used to hedge a full range of interest rate exposures, including: swaps; derivatives; corporate bonds; municipal bonds; and other sovereign bond liquidity. The ability to manage risk by shorting specific Treasury issues enhanced liquidity in all sectors of the dollar-denominated interest rate market. Fixed borrowing rates allowed loans to be made at lower than market cost, which is advantageous to dealers taking those loans. Yet, the Fed sought to preserve the original objective of its lending program, namely, to provide a secondary and temporary source of securities to the Treasury financing market in order to promote smooth clearing of securities. Federal Reserve Bank of New York, Announcement of Revisions to the SOMA Securities Lending Program (Feb. 12, 1999), which is incorporated herein by reference.

The Federal Open Market Committee approved changes to the program to allow the Federal Reserve Bank of New York to lend, on an overnight basis, U.S. Government securities held in SOMA to dealers at rates that are determined by competitive bidding, but in no event are less than 1 percent per annum of the market value of the securities lent. The Fed implemented an auction procedure, assuring SOMA will not become a price-setter in the Specials market. This auction procedure facilitates an equitable and transparent distribution of loans among interested dealers.

The Fed implemented a noon auction time and overnight borrowing term. The minimum bid was set at the rate for general collateral less 150 basis points, but in no event less than 1 percent of the market value of the securities. The authorization granted the Federal Reserve Bank of New York the right to reject bids at its sole discretion when it determined that awarding securities would facilitate a particular dealer's ability to control a specific issue.

If the dealer failed to deliver collateral against the borrowed securities on the loan date, cash was held overnight against the loan without interest, reducing the borrower's reserves. The penalty fee equal to the general collateral rate was assessed in addition to the lending fee. If the dealer fails to redeliver borrowed securities on the maturity date, a fee equal to the prevailing general collateral rate is assessed in lieu of the lending rate. Loan extensions are not permitted. Auction results are announced shortly following each auction and the Fed awards the securities based on a multiple price format auction. Dealers are permitted to submit two bids per issue on as many issues as they choose. Loans are not granted outside of the auction process. Auction results are announced in the form of weighted average award rates and total amounts lent for each issue.

Although the SOMA Repo Market is intended and does enhance and sustain the liquidity of the market in which the Fed's Open Market operations are conducted, the lending facility has not been and is not intended to eliminate specials. Rather, it is intended only to provide a means to alleviate severe shortages in the financing market. See Announcements of Revisions to SOMA Lending Program (Feb. 12, 1999); Federal Reserve Bank of New York, SOMA Securities Lending Program: Terms and Conditions (revised) (effective Sep. 7, 1999); SOMA Securities Lending Program Analysis of Public Comments and Attachment II; Federal Reserve Bank of New York, SOMA Securities Lending Program Primary Dealer Frequently Asked Questions, each of which are incorporated herein by reference.

The United Kingdom Debt Management Office has also implemented a program regarding "special" gilt repo operations. The UK Debt Management Office (DMO) has maintained for several years their "special repo facility" for Gilt-Edged Market Makers (GEMMs) to manage squeezes in the market. This facility has never been used. The rate was set at so high a level that DMO is an unattractive source for repo. Nonetheless, the availability of this repo facility is believed to have had a beneficial effect on relieving squeezes in UK Government Bonds. In response to public comments requesting added clarity in the criteria for the facility, the facility was modified recently to DMO's automatic, "standing" repo arrangement.

The objective of debt management as stated in the DMO report is to "minimize over the long-term the cost of meeting the Government's financing needs, taking into account risk, while ensuring the debt management policy is consistent with the objectives of monetary policy." Official Operations in the Gilt-Edged Market: Operational Notice by the UK Debt Management Office (September 1999), which is incorporated herein by reference. The framework for the UK DMO gilt-edged operations is set out in the report of the Debt Management Review, produced jointly by Her Majesty's Treasury and the Bank of England in July of 1995, which is incorporated herein by reference. The DMO contains a number of facilities, including auctions, taps, conversions, other official operations, provision of reference prices, and announcements. For example, the DMO maintains auctions in conventional stocks, index-linked stocks, and switch auctions.

The DMO maintains procedures for creating stock for repo for market management purposes. Id. at 22. If a particular stock is becoming difficult to trade and the DMO considers there is sufficient evidence of severe market dislocation or disruption, it may create stock, which will be used to repo. Repo is available to all GEMMs who have signed the required legal agreements with the DMO. The terms and availability of the stock are announced. The DMO's policy is that the "special" circumstances need not have been persistent and are not likely to be tied to any single event or difficulty encountered by individual market participants. For example, the DMO typically does not consider short-term problems connected with the delivery process into the futures contract as indicative of severe market dislocation. The terms of the facility, including the penal rate of repo (typically zero percent) and the amount of any stock created are announced through normal channels. Similarly, cancellation is announced in normal channels, when it is judged that the facility is no longer required. These operations typically involve back-to-back, cash-to-cash, reverse repo at the general collateral rate. The UK DMO tap operation, involves issuance of new securities. The DMO creates new stock for repo for market management purposes.

Although the special repo facility for GEMMs has been available to manage squeezes in the market, the facility has never been used. The facility is entirely discretionary with the DMO. UK Debt Management Office DMO Policy Regarding "Special" Guilt Repo Operations (Sep. 17, 1999) which is incorporated herein by reference. The DMO's overall approach is to allow the repo market in specific stocks to clear through relative price movements. If particular stocks come to command a premium in the repo market, this should encourage holders of those stocks to repo them out. The ability to repo specific stocks to the market, as set forth in the DMO's Operational Notice is designed to dissuade manipulation of the market in specific stocks by reducing the prospect of excessive returns and to address instances of market disruption or dislocation when a particular stock is temporarily in extremely short supply. Id.

The DMO has also offered to stand ready to offer overnight any stock in the repo market, at a fixed penal rate, at any time. Availability of this facility would not be linked to indicators of market breakdown. It would instead be automatically available on request to any GEMMs who had signed the appropriate agreement with the DMO. Repos could be rolled over overnight on request and any stock created by the process would be cancelled once the stock was no longer in demand in repo. Such a facility would be unlimited in amount, leading to a more liquid market for particular stocks. UK Management Office: DMO Policy Regarding "Special" Guilt Repo Operations (Sep. 17, 1999). The DMO changed its repo facility on Jun. 1, 2000. The DMO specified that this facility should not interfere with the "normal" workings of the repo market and should not prevent the development of a specials market. Id. One of the express purposes of the DMO's repo facility is to allow the market to continue to operate, even when a security has gone special.

The DMO set the penal rate at a fixed proportion of a reference rate. Specifically, the rate would always be positive to provide an incentive for market participants not to fail on a trade. Rather than fixing a specific penal rate (e.g., 0.50%), the DMO instituted a proportionate penal rate that changes with market conditions. The DMO set a rate that was sufficiently penal that it would not interfere with the "normal" workings of the repo market. The rate at which the DMO makes non-discretionary repo facility available is 10% of the Bank of England's repo rate, charged on an overnight basis. The DMO reserves the right to change the degree of penalty if it believes that it is no longer appropriate.

Rather than limiting the facility to GEMMs who have signed the appropriate repurchase agreement with the DMO, the facility is available to all regularly dealing counter-parties of the DMO who have signed the relevant documentation. The minimum size of the facility was £5 million nominal and no maximum limit was set. Market participants are able to notify the DMO of their intention to use the automatic facility any time (from 12:30 p.m. on the previous day up to 11:30 a.m. for same day settlement of the transaction). The facility is an overnight facility with the option of rolling over the facility indefinitely. However, the DMO does not expect any participant to require the facility to be rolled over for more than a continuous two-week period. The use of the facility would be reviewed if it extended beyond that term. Any stock created for the operation is cancelled. Stock created through this facility is not taken into account when guilt indices are calculated. The DMO publishes on the wire services details of the stock, maturity and amount of any repo operations undertaken under the facility. The facility is available in all non-rump stocks. Both principal and coupon strips could be created and repoed directly if required. The facility is not available for any stock with less than nine working days remaining maturity.

The DMO's Special Guilt Repo Facility has the following features:

- Overnight repo of stock at a penal rate of interest charged to the DMO (10% of the Bank of England's repo rate).
- The borrower posts a general collateral at the Bank of England's prevailing repo rate against the stock being lent to offset the cash flow implications of the repo.
- The DMO announces the amount in terms at which such repo operation had been conducted in the amount of stock created and subsequently cancelled, but not the counter-parties with whom it had dealt.
- The repo facility can be rolled over for a period of time but the DMO expects that any participant will not require the facility to be rolled over for more than a continuous two-week period.
- The special repo facility is open to GEMMs who have signed the relevant documentation, while the standing facility is available to all those regular dealing counter-parties of the DMO who had signed the appropriate repurchase agreements.

United Kingdom Debt Management Office: Response to DMO Consultation Document "Special" Guilt Repo Operations; Annex: General Terms of Special and Standing Repo Operations (February 2000), which is incorporated herein by reference.

It is important to note that the DMO does not make its repo facility available to relieve situations merely in which the stock has become special or in which the stock is being squeezed by a higher market participant. Rather, the DMO requires "sufficient evidence of severe market dislocation or disruption. Circumstances need to have been "persistent" and are not likely to be tied to any single event, or difficulties encountered by individual market participants." Official Operations in the Guilt-Edged Market: Operational Notice by the U.K. at 22 ¶ 95, which is incorporated herein by reference. See also U.K Debt Management Office DMO Policy Regarding "Special" Guilt Repo Operations (Sep. 17, 1999) ¶ 3, a copy of which is incorporated herein by reference. Specifically, the DMO expressly intended that development of its repo market "should not prevent the development of a 'special' market." The United Kingdom Debt Management Office: Response to DMO Consultation Documents on "Special" Guilt Repo Operations, at 2 (February 2000).

As with the Fed's operations, however, the DMO undertakes these operations to clear their Government's securities, stabilize financial markets, and for purposes of monetary policy. Both governmental agencies serve primarily as a lender of last resort and work to eliminate only severe squeezes in the securities rather than to establish liquidity on an everyday basis. Official Operations in the Gilt Edge: Operational Modus of the UK Debt Management Office, at 22 (September 1999).

The Fed and the DMO are Governmental entities. The prior known techniques employed by the Fed SOMA and U.K. DMO have been used for public policy goals, namely, monetary policy. The present inventors are not aware of any of these techniques, either alone or in combination, being used by any private security issuer to increase the liquidity of their own securities. Moreover, the ability of a private issuer to increase the liquidity of their own securities is typically very constrained. Given the volumes involved in the money market, it is typically not possible for private issuers to influence significantly the market for their securities relative to the general collateral rate.

The present invention has employed a new system and process that differs in significant ways from the SOMA and DMO methods to increase the liquidity of privately traded securities. SOMA operations relate only to U.S. Treasury securities. The purpose of the operation is to smooth the clearing and facilitate settlement of U.S Treasury securities. Similarly, the DMO operation seeks to relieve only severe strains and persistent constraints on the market for the DMO's stock issues. Neither has applied the techniques used respectively by them to privately issued securities and, in particular, privately issued debt securities, such as Fannie Mae's Benchmark Notes.

Second, in preferred embodiments of the present invention, the repo facility of the present invention varies from those of the SOMA and DMO repo facilities. The SOMA facility is available to all traders in the market for treasury securities. Similarly, the DMO facility is available to all regularly dealing counter-parties of the DMO who have signed the appropriate purchase agreements. In a preferred embodiment of the present invention, in contrast, the repo facility of the present invention is available to a small group of dealers who are qualified by the issuer.

Further, the degree of specialness of the securities is another difference between prior known techniques and certain preferred embodiments of the present invention. The Fed repo facility typically trades at a fixed range of 150 basis points through general collateral, down to a minimum of one percent of the value of the securities. The Bank of England repo facility trades at ten percent of the Bank of England repo rate. Both markets for Treasury securities and Bank of England stock are substantially larger than the market for privately issued securities.

In contrast, in a preferred embodiment of the present invention, the bid range varies as a function of the Federal Funds rate or other appropriate short-term indices. For example, in a preferred embodiment, the maximum and minimum bid limits may vary depending on the short-term index. At a Federal Funds rate of 5%, the maximum may be set at the general collateral rate less 175 basis points, but not less than 1%. Thus, in a preferred embodiment, at certain levels of the Federal Funds rate, the degree of specialness of the Fed's SOMA repo facility (150 basis points through general collateral) is less than that of some preferred embodiments of the present invention (such as those employing a maximum bid limit of the general collateral rate less 175 basis points but not less than a minimum of 1%). Table 1 depicts some examples of maximum and minimum bid limits that may be employed in certain preferred embodiments of the present invention at various Federal Funds rates.

TABLE 1

| Federal Funds Rate | Maximum Bid | Minimum Bid |
| --- | --- | --- |
| 7% | GC less 200 basis points | Not less than 1% |
| 5% | GC less 175 basis points | Not less than 1% |
| 3% | GC less 100 basis points | Not less than 0.25% |

At other levels of the Federal Funds rate, the degree of specialness of a preferred embodiment of the present invention is less than that of either Governmental facility discussed above, for example the fixed rate of 150 basis points through general collateral for the Fed SOMA repo facility. Accordingly, under certain conditions, a squeeze may be relieved more easily by the present invention in the market for private debt, than in the Fed's or DMO's repo facilities.

Further, in certain preferred embodiments of the present invention, the first portion of the original issuance of the debt is retained and a second portion of that retained portion of the debt is released through the repo facility at any point in time. The Fed SOMA repo facility, in contrast, retains 40 percent of the SOMA facility's holdings. This amount bears no particular relationship to the total amount of Treasury debt issued. The policy goals of the Treasury and the Federal Reserve in its open market operations are different and have, from time to time, conflicted.

While a SOMA facility is based on a percentage of the New York Fed's holdings, the DMO facility has no limit on the amount of stock that it is willing to issue. The SOMA repo facility has increased its percentage from a maximum of 25 percent of its holdings to 40 percent of its holdings. Neither bears any direct relation to the volume of securities issued in the market. In a preferred embodiment, the present invention, in contrast, retains a portion of the original issuance, rather than purchasing issues of securities through Open Market operations (Fed SOMA) or issuing new securities (DMO).

The collateral required for the Fed SOMA repo facility and the DMO facility differs from that of the present invention. The Treasury SOMA repo facility requires deposit of Treasury securities. It expressly does not use cash, which would otherwise deplete member banks' reserves. In a preferred embodiment, the present invention, in contrast, relies on cash transactions.

Although the DMO repo facility is not subject to any maximum, the SOMA repo facility is limited to $100 million out of any auction and $500 million collectively to any one dealer. The DMO facility has no limit on the total amount that can be held, but note the bidder can secure with 25 percent of the issue at an auction. The present invention in contrast is preferably subject to an upper maximum of 20 percent with a $25 million dollar minimum bid.

Thus, the present inventors believe that a number of the features of the present invention are particularly useful on the market for private debt and serve to enhance the usefulness of the present invention to enhance the liquidity and eliminate squeezes in the market for private debt securities.

The prior known methods for relieving squeezes and increasing the liquidity of a security in circumstances in which it has gone special have failed to resolve the needs of private issuers. There remains, therefore, a long felt and substantial need for a system and method for increasing the liquidity of issued securities. The present invention, using an auction facility in the repo market, addresses these needs. In the preferred embodiment of the present invention, the issuer issues debt. The issuer reserves a portion of the debt and lends out a portion of this withheld fraction at regular periods when the availability of additional securities may help relieve a squeeze. Collateral may be held in any of a variety of methods well known to persons of ordinary skill in the art. Similarly, the auction system used to distribute the securities could be any of a variety of methods well known to persons of ordinary skill in the art.

The advantages of the present invention are that it creates demand and increases overnight and short-term repo trading in the affected security. Further, it facilitates larger trades and increases cash liquidity. This, in turn helps investors better hedge insured securities. By providing this asset liquidity, the present invention reduces fails and reduces severe squeezes. Thus, the present invention addresses many of the long felt and unresolved needs of prior known methods of resolving squeezes in securities and increasing the liquidity of a dead issue.

OBJECTS OF THE INVENTION

It is therefore an object of the present invention to relieve squeezes of a security that has become special.

An additional object of a preferred embodiment of the present invention is to create more demand in the issue of a security.

Another object of a preferred embodiment of the present invention is to increase overnight repo trading in a security.

A further object of a preferred embodiment of the present invention is to increase short-term repo trading in a security.

An additional object of a preferred embodiment of the present invention is to facilitate larger trade sizes.

Another object of a preferred embodiment of the present invention is to increase cash liquidity of a security.

A further object of a preferred embodiment of the present invention is to enable investors to better hedge.

Yet another object of a preferred embodiment of the present invention is to enable investors to short securities.

An additional object of a preferred embodiment of the present invention is to reduce fails.

Additional objects and advantages of the invention are set forth, in part, in the description that follows and, in part, will be obvious from the description or may be learned by practice of the invention. The objects and advantages of the invention will be realized in detail by means of the instrumentalities and combinations particularly pointed out in the appended claims.

BRIEF SUMMARY OF THE INVENTION

As illustrated in the accompanying diagrams and disclosed in the accompanying claims, the invention is a system and method for enhancing the liquidity of a security. As embodied herein, the present invention preferably comprises the steps of: issuing the security; retaining a first portion of the issuance of the security; determining when the security is being squeezed; and releasing to the market the first portion, or a part of it, during the squeeze to enhance the liquidity of the market for the security.

In an alternative preferred embodiment, the present invention is a system for repoing a security in a market, comprising: commitment to the market to repo the security; issuance means for issuing the security; retention means for retaining a portion of the security; lending means for lending a second portion of the retained securities when the market for the security is special; and repo means for repoing the securities to enhance the liquidity of the security.

In an alternative preferred embodiment, the present invention comprises: committing to the repo facility; applying the facility to one or more issues of security (including stock, bond, debt, or other security); retaining a first portion (preferably 25% of the issue but at a level that may vary between 25 and 50%, or more broadly, depending on the term, general collateral rate and other factors); lending out a second portion (preferably 15% of the issue but at a level that may vary between 10 and 25%, or more broadly, depending on the term, general collateral rate and other factors); holding the collateral in a sub-account at the Federal Reserve; allowing participation by members of the market (preferably qualified dealers, but by any market participant acceptable to the issuer of the facility); auctioning the second portion (preferably at 11:30 am with closing at 12:00 noon, but at any time that is adapted to accomplish the goals of the invention); setting the minimum bid at a level that correlates to the issuer's determination that the security has become special (preferably the general collateral rate less 175 basis points and not less than 1%, but at any level determined by the issuer of the facility); accepting bids (preferably in a minimum amount of $25 million and in a maximum amount of 20% of the amount lent by auction, but at any other level determined by the issuer of the facility); determining the results of the auction (preferably by Dutch auction format, but by any other format acceptable to the issuer of the facility); releasing the auction results; settlement for collateral (preferably cash, but for any other collateral acceptable to the issuer of the facility); lending the second portion of the security awarded by the auction (preferably overnight, but for any other term acceptable to the issuer of the facility); and repoing the securities at term.

BRIEF DESCRIPTION OF THE DRAWINGS

The present invention will now be described in connection with the following figures.

FIG. 3 is a flowchart depicting an alternative preferred embodiment of the system and method of the present invention.

DETAILED DESCRIPTION OF THE PREFERRED EMBODIMENTS

Figure 1:
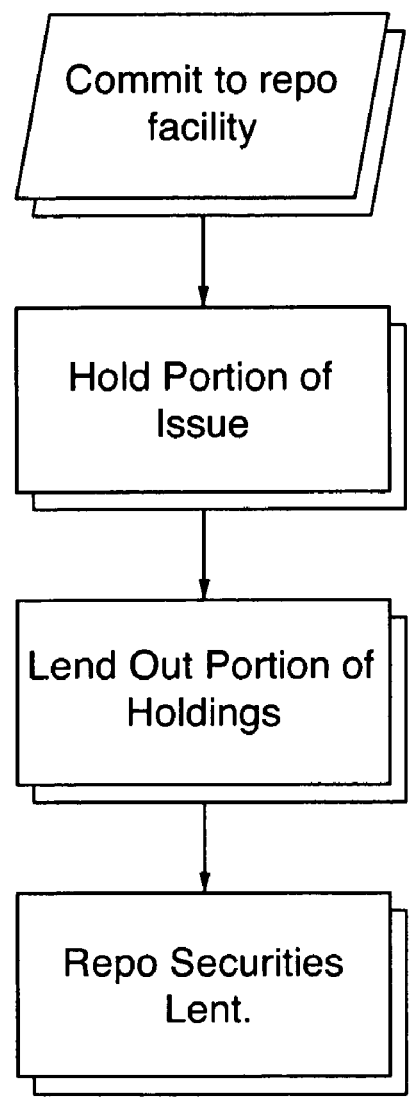
FIG. 1 is a flowchart depicting the system and method of the present invention.
Figure 2:
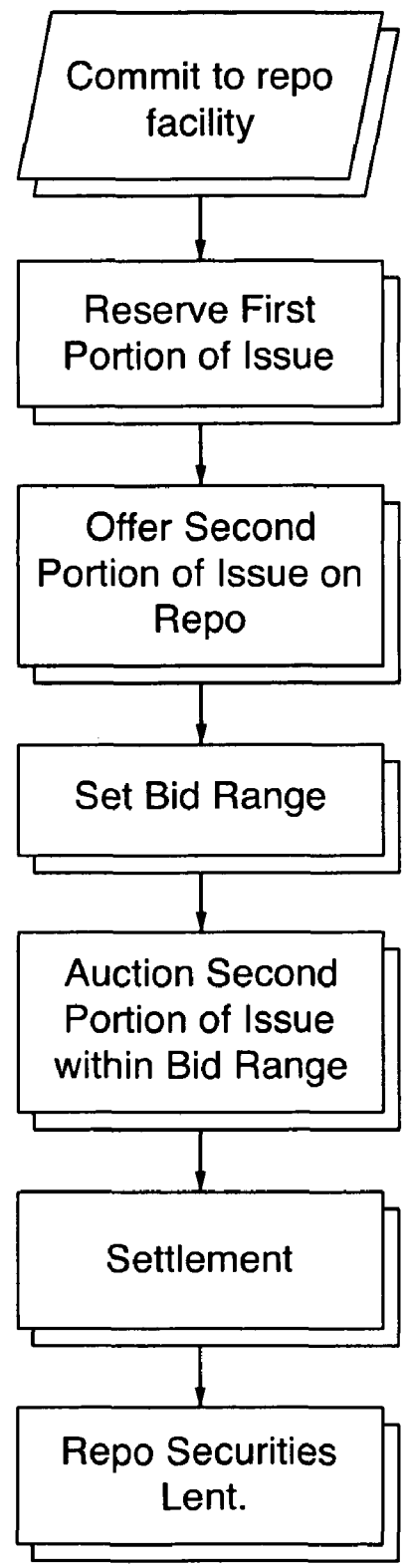
FIG. 2 is a flowchart depicting a preferred embodiment of the system and method of the present invention.

Reference will now be made in detail to a preferred embodiment of the system and method of the repo facility of the present invention. The preferred embodiment of the present invention is shown in FIG. 1.

As embodied herein the present invention comprises a process and system for increasing liquidity and reducing squeezes in an issue of securities. In a preferred embodiment, the invention comprises: holding an issue of a security; determining when the security is being squeezed; and offering to the market a first portion of the holding to enhance the liquidity of the market for the security and reduce squeezes in the security. This method of the present invention preferably further comprises using an auction system to lend the securities.

The present invention, in contrast to the examples identified above of repo facilities offered by the United States Treasury and the UK Debt Management Office, functions to increase the liquidity of an issue. Specifically, the Treasury has used the repo facility discussed above to inject reserves temporarily into the banking system, without affecting the interest rate risks that market participants have to bear. The use by Treasury of the repo facility provides financing of existing dealer positions for a few days rather than requiring a change in positions. When a SOMA manager wants to absorb reserves for several days, matched sale-purchase (MSPs) transactions with dealers provide a vehicle to do so. Repo or MSPs enable the SOMA to respond quickly when reserves fall short of desired levels or prove excessive. US Monetary Policy and Financial Markets, Federal Reserve Bank of New York (1982) at 120-124, 138, 154-156, which are incorporated herein by reference. SOMA integrates its repo and MSP operations with the temporary investment activity of foreign accounts to achieve reserve objectives and to reduce the number of market entries. The pass through of customer orders and repos made for the system account supply reserves to the banking system and increase non-borrowed reserves relative to the levels shown in daily projections. Id. Thus, the Treasury's use of repo is primarily for the purpose of modifying the level of non-borrowed reserves in the banking system, in contrast to the primary purpose of the present invention, which is to increase liquidity in the issue being repoed. Although the UK Debt Management Office has also offered to repo its gilt issues, the UK Debt Management Office has reported publicly that it has never actually had to repo its securities. The present invention, in contrast to the two governmental repo facilities discussed above, may be used by an issuer to increase the liquidity of the market for its own issue. This function may be employed by a governmental entity, a government agency, or a private issuer of a security.

It will be apparent to persons of ordinary skills that various modifications and variations of the present invention may be made without departing from the scope or spirit of the invention as claimed. For example, a number of constraints may be imposed on a particular enterprise based on a variety of legal or business issues, such as: book accounting methods; securities laws; tax laws; the desire not to issue more debt outstanding that is needed; and the desire not to book issuance of debt prior to the time when it is necessary. The present invention is adapted to these variations and modifications in that the debt may be issued but booked only upon repo of the security. Alternatively, various portions of the debt issuance may be held and made available to the present invention to increase the liquidity of the security at a later date. Similarly, proportions of the portion withheld from the original debt issuance may be made available at any given time to reduce the squeeze. It would be apparent to persons of ordinary skill in the art that volumes, pricing, and timing constraints will facilitate the liquidity of the security while maintaining a vibrant market in the security. Thus, it is intended that the invention include the various modifications and variations of the invention, provided they come within the scope of the appended claims and their equivalents.

In an alternative preferred embodiment of the present invention, the process of the present invention comprises one or more of the following steps:

Committing to the market the availability of the repo facility;
Issuing a security;
Retaining or withholding a portion of the issue;
Any portion that is issued to third parties will be considered issued and outstanding for accounting purposes;
The amount withheld by the issuer will be held as collateral in a sub account at the Federal Reserve Bank;
The portion retained at the Fed is not considered issued for book purposes;
When some repo transaction is entered by the issuer, the accounting transaction would be recorded based upon the terms of the repo agreement.

In an alternative preferred embodiment of the present invention, securities may be lent over a coupon date and have a coupon payment. In these situations, the coupon payment may be recorded as follows. The coupon payment is preferably recorded on the balance sheet as a debit to interest expense and credit for interest receivable. These entries preferably offset each other and have no impact on the long-term accounting of the issuer. Table 2 identifies some example entries for a $5.0 billion dollar issue with 25% of each new issue reserved and 15% lent out through the repo facility.

TABLE 2

| Entry at Issuance of Debt | Entry to Record Receipt of Cash | Entry Repay of Cash |
|---|---|---|
| Debit Cash - $5 Billion Credit Long Term Debt - $5 Billion | Debit Cash - $550 Million Credit Repo Liability - $750 Million | Debit Repo Liability - $750 Million Debit Interest Expense - $1 Million Credit Cash - $751 Million |

In an alternative preferred embodiment, the present invention comprises: committing to the market to provide the repo facility; applying the facility to one or more issues of security; issuing the security; retaining a first portion of the issue (preferably 25%, but at a level that may vary between a range of about 25% to about 50% or more widely, depending on the term, general collateral rate, and other factors); offering to lend out a second portion (preferably 15% of the issue, but at a level that may vary between a range of about 10% and about 25% of the issue, or more widely, depending on the term, general collateral rate, and other factors); holding the collateral; allowing participation by members of the market; auctioning said second portion; setting the minimum bid at a level that correlates to the issuer's determination that the security has become special; accepting; determining the results of the auction; releasing the auction results; settlement for collateral; lending the second portion of the security awarded by the auction; repoing the securities at term.

In a preferred embodiment, the security may be a stock, bond, debt instrument or any other marketable security or instrument. The first portion is preferably 25% and the second portion preferably 15%. This ensures that the issuer of the facility retains sufficient securities to make the repo facility available to the market on subsequent days, even in the event of fails, enabling the issuer of the facility to make the facility available every day if desired. In a preferred embodiment the first portion and the second portion may vary, depending on various factors. For example, when the term is extended beyond overnight lending, the first portion may be increased to about 50%, or higher levels. Similarly, the second portion may be varied between a range of about 10% to about 25%, or more widely.

The collateral is preferably held in a sub-account at the Federal Reserve but may be held in any other manner well known in the art. Participation is preferably limited to qualified dealers, but any market participant acceptable to the issuer of the facility may be permitted to participate.

The auction itself may occur at any time that accomplishes the desired goals of the invention. The auction is preferably held at 11:30 am with closing at 12:00 noon. The auction is preferably structured with a minimum bid set at the general collateral rate less about 175 basis points and not less than about 1%. It may be structured at any minimum bid, or no minimum, that is acceptable to the issuer of the facility. Bids are accepted, bids preferably in a minimum amount of $25 million and in a maximum amount of 20% of the amount lent by auction, but at any other level determined by the issuer of the facility. The results of the auction are preferably determined by Dutch auction format, but any other format acceptable to the issuer of the facility may be employed.

Settlement is preferably for cash but may be in the form of any security acceptable to the issuer of the facility. Term is preferably overnight but may be for any term, intraday, multiple day, week, and multiple week, or other term acceptable to the issuer of the facility.

The present invention may be illustrated by several simple examples of the operation of a preferred embodiment of the present invention.

EXAMPLE 1

The issuer issues debt in the amount of approximately $4 billion dollars. The debt market for the security is operating smoothly at about a 5% general collateral (GC) rate (general financing rate). In this situation, the issuer would offer repo in a security at a rate significantly lower than the rate at which the security, and comparable securities, are trading in the open market. In this example, the issuer would prefer to repo the security at a maximum rate of GC less 200 basis points but not less than 1%. Based upon an issuance of $4 billion dollars of which $1 billion dollars was withheld by the original issuer (25%) and $3 billion dollars released to the market, the issuer would have $1 billion dollars of the securities available to repo.

If the issuer were to decide to make only 15% of the issue available at any time for repo, the issuer would announce to the market that it was willing to repo $600 million dollars worth of the issue of its debt securities. In order to insure that the repo market did not compete directly with the primary market for the securities and enable the issuer to remain as the lender of last resort, the issuer would preferably repo the securities at a rate of GC less 200 basis points but not less than 1%.

If the market continued to function well throughout the period when the repo facility was available, purchasers of the security would find it more attractive to purchase the security on the open market at the GC rate, rather than to repo the security from the original issuer at a significantly lower rate of GC less 200 basis points but not less than 1%. Accordingly, although the repo facility would be available to enhance the liquidity of the market, it would not be needed and would not likely be used. The mere fact of offering to repo the security may, in some circumstances, prevent the issue from becoming special. This was the experience of the UK DMO discussed above. Thus, it is intended that the present invention cover the offering of the present invention whether or not the securities are actually subject to a repurchase agreement. If a particular issuer was caught short at any time, the facility would be available and they could resort to it, restoring liquidity in the market.

EXAMPLE 2

The issuer issues debt in the amount of approximately $4 billion dollars. The security is operating at about 5% in the repo market. A dealer accumulates a significant amount of the issue of the security, constraining its availability and pushing the price up and financing rate down. While the general collateral rate remains at 5%, the security is now trading at about 3% in the repo market. The issue has become special. Liquidity in the market for the security is constrained and those buyers seeking to purchase the security cannot find adequate supply. The issuer would prefer to repo the security at GC less 200 basis points but not less than 1%. Based upon an issuance of $4 billion dollars of which $1 billion dollars was withheld by the original issuer (25%) and $3 billion dollars released to the market, the issuer would have available $1 billion dollars of the security to repo.

As the issue is now special and the supply of securities is constrained, relative to comparable investments, the repo market competes at the margin with the primary market for the securities. This enables the issuer to supply additional securities to the market through the repo lending facility. To the extent that the borrower cannot secure the securities from the market at an interest rate better than GC less 200 basis points, the issuer's repo facility provides an attractive source for the securities.

An auction is held and the following bids are received:

TABLE 3

Hypothetical Bidding Transactions

| Volume | Repo Rate | Bidder |
| --- | --- | --- |
| $25 Million | 2.5% | Bidder 1 |
| $250 Million | 2.3% | Bidder 2 |
| $250 Million | 2.0% | Bidder 3 |
| $100 Million | 2.0% | Bidder 4 |

After the auction has completed, the bids would be tabulated and the issuer would assess the winner based on any of a number of bidding strategies. In one preferred embodiment of the present invention, bidding would be accepted on the basis of a multi-price auction. Based on the above example in which $600 million dollars worth of the security was being repoed, Bidder number 4 would receive $100 million at 2%; Bidder number 3 would receive $250 million at 2%; Bidder number 2 would receive $250 million at 2.3%; and Bidder number 1 would receive none of the securities for which it had bid at 2.5%. Bidders would be notified promptly.

EXAMPLE 3

The issue is made in the same manner as Example 2 and the repo facility operates in the same manner. An auction is held and the following bids are received:

TABLE 4

Hypothetical Bidding Transactions

| Volume | Repo Rate | Bidder |
|---|---|---|
| $75 Million | 2.0% | Bidder 1 |
| $225 Million | 1.5% | Bidder 2 |
| $225 Million | 1.25% | Bidder 3 |
| $100 Million | 1.0% | Bidder 4 |

After the auction has completed, the bids would be tabulated and the issuer would assess the winner based on any of a number of bidding strategies. In one preferred embodiment of the present invention, bidding would be accepted on the basis of a multi-price auction. Based on the above example in which $600 million dollars worth of the security was being repoed, Bidder number 4 would receive $100 million at 1%; Bidder number 3 would receive $225 million at 1.25%; Bidder number 2 would receive $225 million at 1.50%; and Bidder number 1 would receive only two thirds of its $75 million dollar bid ($50 million) at 2.0%.

In each of the above examples, the debt would not be booked by the issuer until it had been repoed.

It will be apparent to persons of ordinary skill that various modifications and variations may be made in the system and method of the present invention without departing from the scope of the invention as claimed. For example, any number of a variety of securities, bonds, equities, or debt instruments could be employed in the system and method of the present invention. The minimum and maximum bid amounts may be modified broadly to achieve the issues desired goals, to provide longer-term repo, or to accommodate other market conditions. Similarly, the auction format could be multi-priced, Dutch auction, reverse auction, or any other suitable auction—or non-auction—format that is adapted to the present invention. Further, the term of the facility could be varied from overnight to longer terms such as multiple day or week or multiple week terms. Similarly, the term could be shortened to intraday, or issued on a continual basis. It will be apparent to persons of ordinary skill that the particular needs of a specific market situation and the specific security and issuer can dictate modification of the various terms to adapt the present invention to the needs of the issuer and to the market. Thus, it is intended that the present invention include all of the variations and modifications of the present invention provided they come within the scope of the appended claims and their equivalents. The criteria for determining when the security has become special can vary. Similarly, specifications for lending of the security to ensure that the market remains liquid but that the issuer also remains as lender of last resort rather than a direct competitor on the market for its own securities may be modified in a way that would be apparent to persons of ordinary skill in the art.

In a preferred embodiment of the present invention, the auction method of the present invention would be a multi-priced auction. Bids would be filled at the price submitted by the bidder, that is at the level of the range that is most attractive to the issuer until the amount of debt that the issuer is releasing during that auction has been filled.

In an alternative preferred embodiment of the present invention, the auction may be based on a "Dutch auction" format. In this format, each of the bidders would receive the price at which the last successful bidder was accepted. The price could be determined on the basis of that price which is most desirable to the bidders or to the issuer. Alternatively, the auction could be run in a reverse auction format, allowing the bidder to submit criteria based on volume, price, or other criteria allowing the issuer to determine the acceptability of the bid.

Although in the preferred embodiment of the present invention, the present inventors believe that retaining 25% of the original issuance and releasing 15% of the amount withheld is preferable, other variations and modifications may be made without departing from the scope or spirit of the invention as claimed. For example, 10, 20, 25, 30, 40, 50 or any other suitable percentage of the securities may by retained. Similarly, any suitable percentage of the securities may be lent. The numbers employed in the preferred embodiment insure that there would be adequate securities retained by the issuer to relieve a squeeze if one becomes apparent. In addition, releasing a smaller proportion of the amount withheld insures that to the extent that there are fails to redeliver the securities at the repo settlement, the issuer continues to have additional securities available to provide added liquidity at subsequent repo intervals.

Thus, it is intended that the present invention include all of the variations and modifications, provided they come within the scope of the appended claims and their equivalents.

I claim:

1. A method for enhancing the liquidity of a tradable security, comprising the steps of: holding an issue of the security; retaining, by a computer system, a first portion of the holding; determining, by the computer system when the security is being squeezed; and offering to the market a second portion of the holding during the squeeze other than for the purpose of effecting non-borrowed reserves and to enhance the liquidity of the market for the security.

2. The method according to claim 1, wherein the step of offering to the market a second portion of the holding further comprises the step of auctioning the second portion of the holding to a group of market participants according to a pre-determined bid range.

3. The method according to claim 2, wherein the bid range comprises a minimum bid set at a rate that is greater than or equal to about the rate for general collateral less about 175 basis points and not less than about 1%.

4. The method according to claim 2, further comprising the step of determining the results of the auction according to a pre-determined format.

5. The method according to claim 1, wherein the first portion varies between a range of about 25% to about 50% of the issue.

6. The method according to claim 1, wherein the second portion varies between a range of about 10% to about 25% of the issue.

7. The method according to claim 1, wherein the second portion comprises all of the first portion.

8. The method according to claim 1, wherein the second portion comprises less than all of the first portion.

9. The method according to claim 1, further comprising the step of repoing the second portion of the holding.

10. A method for enhancing the liquidity of a tradable security, comprising the steps of: committing to provide a repo facility for the security; issuing the security; retaining, by a computer system, a first portion of the issuance of the security; establishing criteria for lending a second portion of the retained first portion of the issuance by the computer system; lending the second portion of the issuance of the security pursuant to the criteria other than for the purpose of effecting non-borrowed reserves; and re-opening the second portion of the issuance pursuant to the criteria.

11. The method according to claim 10 wherein the step of lending the second portion of the issuance further comprises the step of auctioning the second portion of the issuance to a group of market participants, and the established criteria comprises a pre-determined bid range.

12. The method according to claim 11, wherein the bid range comprises a minimum bid set at a rate that is greater than or equal to about the rate for general collateral less about 175 basis points and not less than about 1%.

13. The method according the claim 11, further comprising the step of determining the results of the auction according to a pre-determined format.

14. The method according to claim 10, wherein the first portion varies between the range of about 25% to about 50% of the issue.

15. The method according to claim 10, wherein the second portion varies between the range of about 10% to about 25% of the issue.

16. The method according to claim 10, wherein the second portion comprises all of the first portion.

17. The method according to claim 10, wherein the second portion comprises less than all of the first portion.

18. A system for repoing a security in a market, comprising:
   commitment to the market to repo the security;
   issuance means for issuing the security;
   retention means for retaining a portion of the security;
   lending means for lending a second portion of the retained securities when the market for the security is special other than for the purpose of effecting non-borrowed reserves; and
   repo means for repoing the securities to enhance the liquidity of the security.

19. A method for enhancing the liquidity of a tradable security by an entity selected from the group consisting of:
   a private issuer, a non-treasury entity, a non-governmental entity, and a non-agency entity, said method comprising the steps of, holding an issue of a security; retaining, by a computer system, a first portion of the holding; determining, by the computer system, when the security is being squeezed; and offering to the market a second portion of the holding during the squeeze other than for the purpose of effecting non-borrowed reserves and to enhance the liquidity of the market for the security.

20. The method according to claim 19, wherein the step of offering to the market a second portion of the holding further comprises the step of auctioning the second portion of the holding to a group of market participants according to a pre-determined bid range.

21. The method according to claim 20, wherein the bid range comprises a minimum bid set at a rate that is greater than or equal to about the rate for general collateral less about 175 basis points and not less than about 1%.

22. The method according to claim 20, further comprising the step of determining the results of the auction according to a pre-determined format.

23. The method according to claim 19, wherein the first portion varies between a range of about 25% to about 50% of the issue.

24. The method according to claim 19, wherein the second portion varies between a range of about 10% to about 25% of the issue.

25. The method according to claim 19, wherein the second portion comprises all of the first portion.

26. The method according to claim 19, wherein the second portion comprises less than all of the first portion.

27. The method according to claim 19, further comprising the step of repoing the second portion of the holding.

28. A method for enhancing the liquidity of a tradable security stored on a computer readable medium for causing a computer to perform the steps comprising: holding an issue of the security; retaining by a computer system a first portion of the holding; determining that the security is being squeezed; and offering to the market a second portion of the holding during the squeeze to enhance the liquidity of the market for the security.

\* \* \* \* \*